April 30, 1929.  B. STOCKFLETH ET AL  1,711,224
STEERING MECHANISM FOR VEHICLES
Filed April 29, 1926   3 Sheets-Sheet 1
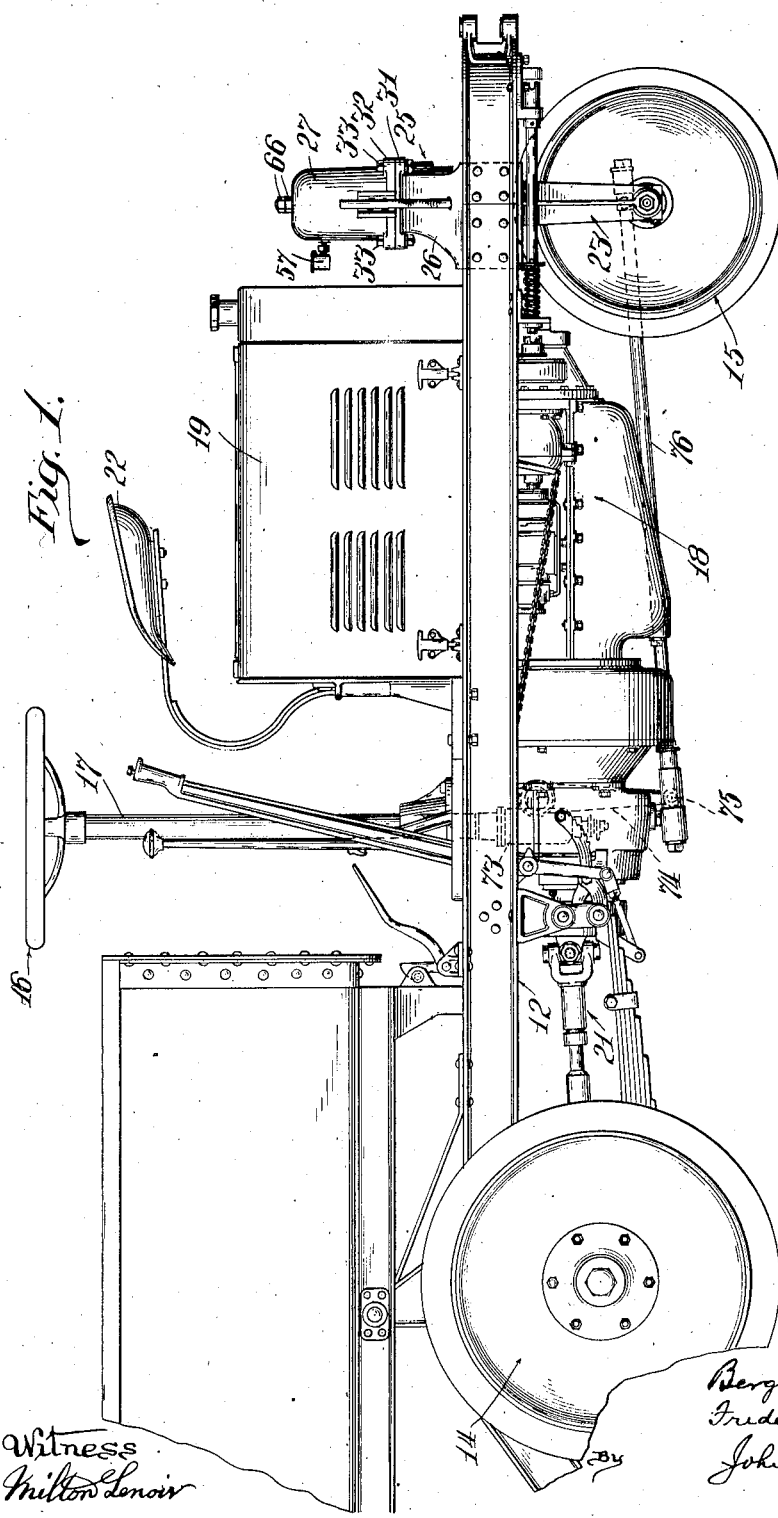

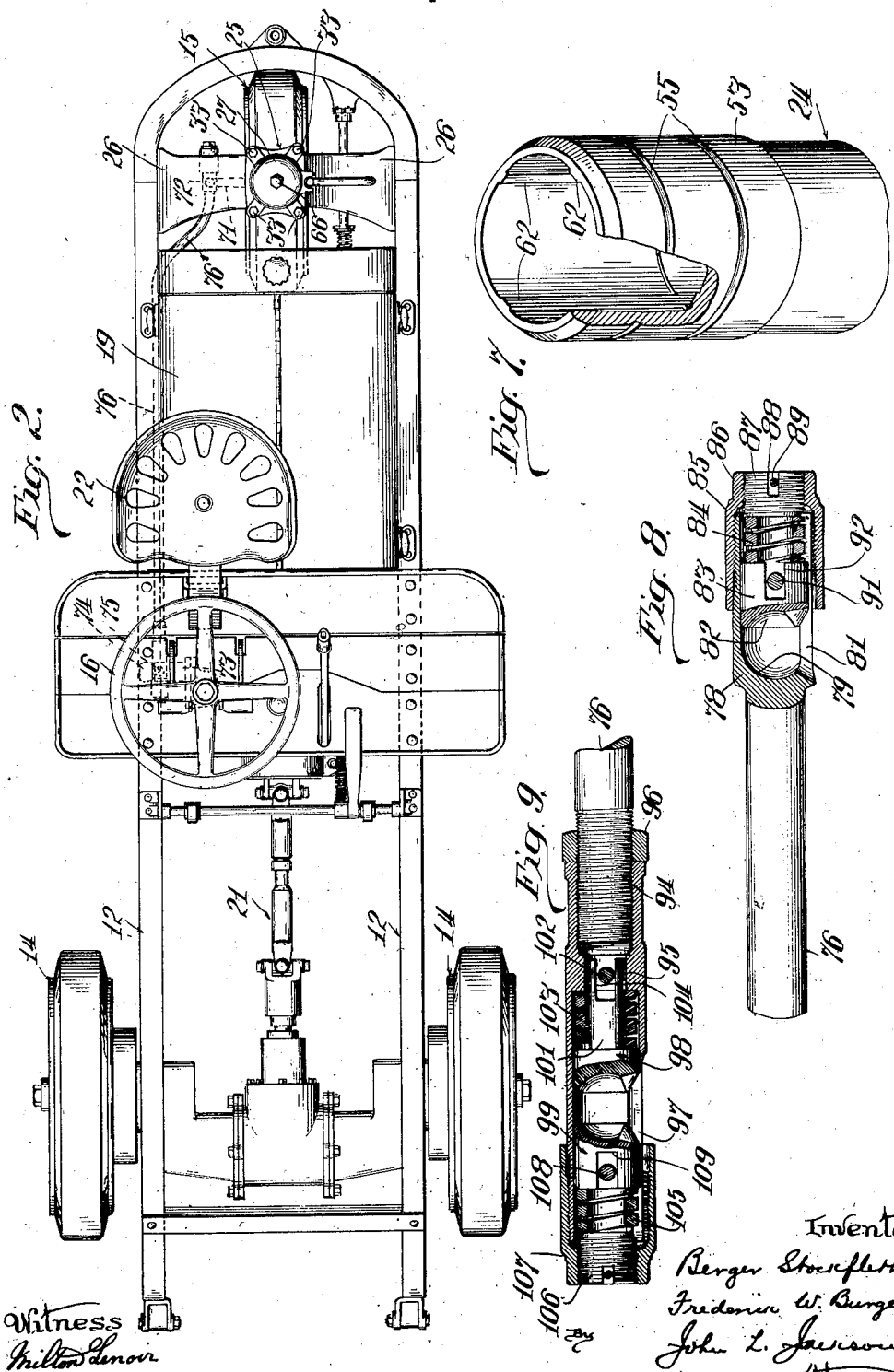

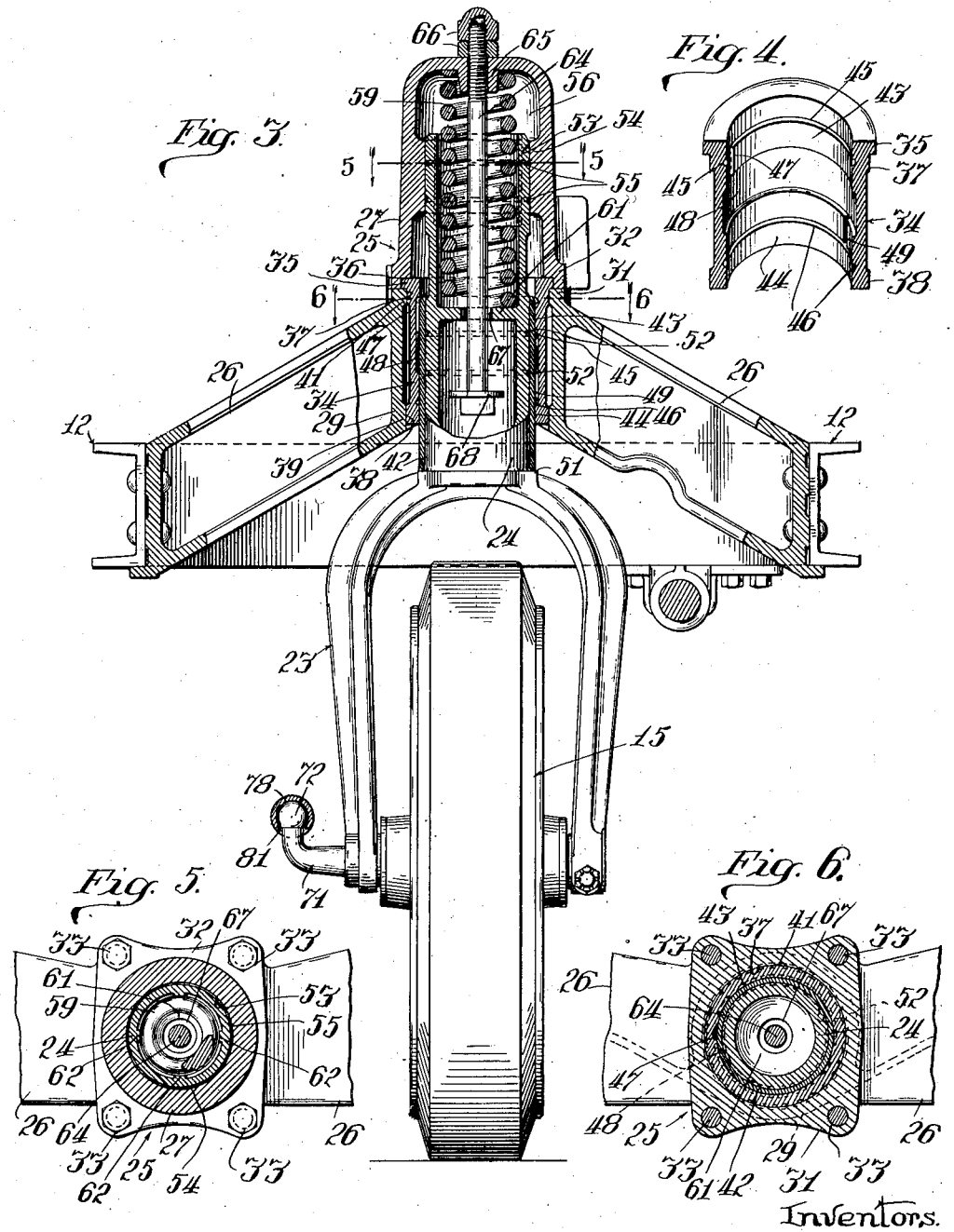

Patented Apr. 30, 1929.

1,711,224

UNITED STATES PATENT OFFICE.

BERGER STOCKFLETH, OF BERRIEN SPRINGS, AND FREDERICK W. BURGER, OF NILES, MICHIGAN, ASSIGNORS TO CLARK TRUCTRACTOR COMPANY, OF BUCHANAN, MICHIGAN, A CORPORATION OF MICHIGAN.

STEERING MECHANISM FOR VEHICLES.

Application filed April 29, 1926. Serial No. 105,449.

Our invention relates to steering mechanism for vehicles.

The present construction of steering mechanism has been developed primarily for use on industrial trucks, tractors and like vehicles, in which the steering is effected through a single caster type of dirigible wheel, and one of the particular features of the invention resides in the manner in which this dirigible wheel is supported. This improved mounting for the dirigible wheel is characterized, first, by an improved arrangement comprising removable bearing bushings which reduce machining expense and which can be readily substituted in the event of wear; and second, by improved means for distributing the lubricant throughout the above mounting means.

Referring to the accompanying drawings, wherein we have shown a preferred embodiment of our invention:

Figure 1 is a side elevational view of a typical type of vehicle embodying our invention;

Fig. 2 is a plan view of the same, with the load carrying body removed;

Fig. 3 is a vertical sectional view through the bearing bracket which supports the dirigible wheel;

Fig. 4 is a sectional view in perspective of the removable bearing bushing;

Fig. 5 is a transverse sectional view taken on the plane of the line 5—5 of Fig. 3;

Fig. 6 is a similar sectional view taken on the plane of the line 6—6 of Fig. 3;

Fig. 7 is a fragmentary perspective view of the upper end of the steering fork plunger, a portion thereof being broken away;

Fig. 8 is a longitudinal sectional view through the cushioned socket at the steering wheel end of the drag link; and Fig. 9 is a similar sectional view through the cushioned socket at the steering column end of the drag link.

Figs. 1 and 2 illustrate the type of vehicle to which the invention has particular application; it being evident, however, that some of the broader features of our invention can be applied to other types of vehicles. The frame 12 is supported at one end by the two drive wheels 14 and at the other end by the single caster wheel 15, which latter wheel is mounted centrally at this end of the frame. Steering is effected through this caster wheel which is controlled by the conventional hand steering wheel 16 on the upper end of the steering column 17 supported at a point intermediate the ends of the vehicle, corresponding to the driver's position. The power plant 18, housed under a hood 19 adjacent the steering end of the vehicle, propels the driving wheels 14 through any suitable drive mechanism designated 21 in its entirety. Either end of the vehicle may constitute the front end; in the particular construction shown the driving end of the vehicle is the front end with the driver's seat 22 supported over the engine hood 19 and facing this front end.

Referring now to Fig. 3, the dirigible caster wheel 15 is pivoted between the arms of the steering wheel fork 23. This fork comprises an upwardly extending plunger 24 which is reciprocably and rotatably journalled in an upright bearing, designated 25 in its entirety. This bearing comprises a cross member 26 riveted at its ends to the main frame 12, and an upper cap 27 bolted to the cross member, these two elements forming an inverted Y shaped bearing bracket, into which extends the plunger end of the steering wheel fork. The cross member 26 is formed with a central cylindrical boss 29 and with a substantially square flange 31 at the upper end thereof. The lower end of the cap 27 has a matching flange 32 and these two flanges are secured together by bolts 33 which pass through alined holes in the corners of both flanges.

Mounted in the cylindrical boss 29 is a bearing bushing 34, which bushing is illustrated in detail in Fig. 4. The upper end of this bushing has a retaining flange 35 which engages in an annular recess 36 formed in the lower end of the cap 27, whereby the bushing is securely held in place in the cylindrical boss 29. It will be apparent that by merely removing the cap 27 the bushing can be quickly substituted by another in the event of excessive wear. Supporting contact between the bushing 34 and the boss 29 is confined to flanged surfaces 37 and 38 at the ends of the bushing, bearing against internal flange surfaces 39 and 41 at the ends of the boss 29, these spaced points of engagement reducing the machining operations necessary to fit the bushing within the boss.

A removable bearing sleeve 42 surrounds the lower part of the plunger 24 and has bearing engagement with inwardly projecting bearing surfaces or flanges 43 and 44 at the upper and lower ends of the bearing bushing 34. Annular lubricant distributing grooves 45 and 46 are formed in each of these internal bearing surfaces. As clearly shown in Fig. 4, a downwardly extending connecting channel 47 leads from the upper groove 45 into the annular space 48 between the bearing surfaces 43 and 44, and, at a point substantially opposite the first channel 47, a second channel 49 is formed to convey the lubricant from this annular space 48 down into the lower groove 46. The lower end of the bearing sleeve 42 abuts a shoulder 51 at the bottom of the plunger 24 and in the normal position of the plunger the upper edge of the sleeve uncovers the upper groove 45 to a flow of lubricant seeping down along the outside of the plunger. Two annular grooves 52 may also be formed in the lower part of the plunger to catch lubricant for lubricating the surfaces between the plunger 24 and bearing sleeve 42.

This lower portion of the plunger, together with its surrounding bearing surfaces, may be considered as a pilot bearing for the steering wheel fork. This portion of the bearing receives the brunt of the wear from side thrust, etc., and hence we have provided the renewable bearing elements 34 and 42 so that these bearing surfaces can be readily replaced when desired.

The upper end of the plunger is formed with a second bearing portion 53, which is guided in an inwardly extending flange 54 formed in the upper part of the cap 27. The bearing portion 53 is also provided with annular grooves 55 for distributing lubricant between these upper bearing surfaces. The area in the upper end of the cap 27 above the bearing flange 54 constitutes a lubricant pocket 56, into which discharges a grease cup or other lubricant supply fitting which screws into the front of the cap 27 (see Fig. 1). From this pocket 56 the lubricant works down between the bearing surfaces as hereinbefore described.

The steering fork has resilient reciprocability in the bearing bracket just described through the interposition of a coil spring 59 between the top of the cap 27 and the plunger 24. This spring extends down into the open upper end of said plunger, which is hollow and bears against a web 61 extending across the interior of the plunger. At its upper end, the interior of the plunger is fluted, or formed with a plurality of widely spaced vertical ribs 62, as best shown in Fig. 7. Upward reciprocation of the plunger 24 in the bearing bracket 25 is limited by engagement of the steering fork with the bottom of the cross member 26, or with the bottom of the bearing bushing 34. To prevent the steering fork and plunger from dropping out of the bearing bracket 25, in the event that this end of the vehicle frame is raised, a bolt 64 is suspended from the boss 65 in the top of the cap 27. Two lock nuts 66 thread over the upper end of said bolt and removably hold the same suspended from the top of the cap. The bolt 66 passes through a hole 67 in the web 61 and carries a shoulder or collar 68 at its lower end adapted to strike the under-side of the web 61 and thereby prevent the plunger from dropping completely out of the bearing bracket.

A steering arm 71 extends from the axle on which is journalled the dirigible wheel 15, such steering arm having the usual ball end 72. Also extending from the lower end of the steering column 17, or from its operating mechanism 73, is another steering arm 74 having a similar ball end 75 (Fig. 1). A drag link 76, operatively connects these steering arms, such drag link having a curved portion 76' formed therein for clearing the front edge of the caster wheel when the latter is swung clockwise (Fig. 2).

Figs. 8 and 9 illustrate in detail the improved forms of cushioned sockets employed at the ends of the drag link for making operative connection with the aforesaid steering arms, and the construction there shown will be described although it is not included in our present application. Referring first to the socket located at the steering wheel end of the drag link, (Fig. 8), this end of the link is formed with an enlarged tubular socket portion 78 having a semi-spherical depression 79 in its inner end. The tubular portion 78 is provided with a slot 81 extending along the bottom thereof, this slot receiving the steering arm 71 and having its end beveled to accommodate the pivotal movement of said arm. The other half of the spherical socket is completed by the semi-spherical depression 82 in the end of a plunger 83, which is guided for reciprocable movement in the outer end of the tubular socket portion 78. One side of this semi-spherical depression is also beveled or chamfered off to accommodate the angular movement of the steering arm 71. A heavy compression spring 84 bears against the other end of the plunger 83, forcing said plunger into firm engagement with the ball end 72 on the steering arm 71. Such ball end is inserted into and removed from the spherical socket thus formed through the open end of the tubular socket portion 78.

Screwing over said open outer end is a sleeve 85 which has an internally threaded boss 86 at its end, into which screws a plug 87. This plug is provided with a transverse slot 88 in its end, through which the plug can be rotated to vary the pressure of the spring 84, said plug acting as an abutment for the end of the spring. A pin 89 is adapted to be passed through the boss 86 and slot 88 for locking the plug in adjusted position. A second pin 91 is adapted to be passed through a diametrical slot 92 in the plunger 83 so as to hold said plunger against rotation while still permitting reciprocation under the pressure of the spring 84. The ends of the pin 91 preferably extend up through openings or slots in the outer sleeve 85, thereby locking said sleeve against accidental disengagement from the socket portion 78.

The cushioned socket construction at the steering column end of the drag link is generally similar to that just described, except that both sides of the socket have spring cushioned engagement with the ball. In this form, the end of the drag link is threaded, as indicated at 94, for screwing into the end of a relatively long tubular socket portion 95, a check nut 96 being provided for locking any adjusted setting given this tubular member 95 on the drag link 76. One side of the tubular socket portion 95 is slotted longitudinally, as indicated at 97, for receiving the front steering arm 74. The spherical socket which receives the ball end 75 is defined between two spring pressed plungers 98 and 99 having semi-spherical depressions in their opposing ends and having their sides beveled or chamfered off opposite the slot 97 to accommodate the angular movement of the steering arm 74. The plunger 98 has a stem 101 extending therefrom, the end of which is slotted for embracing a guide pin 102 which prevents rotation of the plunger 98 while permitting its yieldable reciprocation. A compression spring 103 is confined between the rear side of the plunger 98 and a shoulder 104 in the tubular socket portion 95. The spring mounting for the other plunger 99 is practically a duplicate of that described for the plunger 83 of Fig. 8. A compression spring 105 is confined between the end of this plunger and a threaded plug 106 screwing into the end of a sleeve 107 which screws over and closes the end of the tubular socket 95. A transversely extending pin 108 passes through a slot 109 in the plunger 99 and prevents its rotation.

The two cushioned sockets just described provide a desired resiliency between the steering wheel and the steering column. This resiliency absorbs vibration set up by the steering wheel striking obstructions in the travel of the vehicle, and thus avoids the transmission of such vibration to the steering wheel 16 and also alleviates the wear incident to such vibration. Moreover, this cushioned socket construction takes up all play or lost motion in the drag link connections as fast as the parts thereof wear.

Having thus described the embodiment of our invention illustrated in the accompanying drawings, we wish it to be understood that it is not restricted to the specific features of the construction illustrated and described, except in so far as they are particularly claimed, but includes generically the subject-matter pointed out in the broader claims, and such modifications or variations thereof as would occur to those skilled in the art.

What we claim as our invention and desire to secure by Letters Patent of the United States, is:

1. In a vehicle, the combination of a frame, a supporting bearing carried thereby, a steering wheel, a fork supporting said wheel and comprising a plunger portion having rotatable and reciprocable mounting in said bearing, a removable bearing bushing interposed between said supporting bearing and said plunger portion, spaced bearing surfaces in said bushing forming an intermediate annular space therebetween, annular lubricating grooves in each of said bearing surfaces, and distributing channels leading from each of said grooves and opening into said annular space.

2. In a vehicle, the combination of a frame, a cross member having its ends secured to said frame, a cylindrical boss carried by said cross member, a bearing cap bolted to the upper end of said cylindrical boss, a steering wheel, a fork supporting said steering wheel and comprising a plunger portion having rotatable and reciprocable mounting in said cylindrical boss and said bearing cap, a removable bearing bushing interposed between said cylindrical boss and the lower part of said plunger portion, spaced upper and lower bearing surfaces in said bearing bushing, means for distributing lubricant over said bearing surfaces, a removable bearing sleeve carried by the lower part of said plunger portion and contacting with said bearing bushing, an inwardly extending flange formed in said bearing cap, an upper bearing surface on said plunger portion having bearing engagement with said flange, means for distributing lubricant between said upper bearing surface and said flange, and means for supplying lubricant to the upper part of said bearing cap above said bearing flange.

3. In a vehicle, the combination of a frame, a supporting bearing carried thereby, a dirigible wheel, a fork supporting said dirigible wheel, and comprising a hollow plunger portion extending into said bearing, a web extending laterally across said hollow plunger, a spring the major portion of which extends into said plunger and rests on said web, and a cap surrounding the upper portion of said spring and secured to said supporting bearing.

4. In a vehicle, the combination of a frame, a supporting bearing carried thereby, a dirigible wheel, a fork supporting said dirigible wheel and comprising a tubular plunger portion extending into said bearing, a web extending laterally across said tubular plunger, a spring extending into said plunger and resting on said web, a cap secured to said supporting bearing and extending over said spring, a rod secured at its upper end in said cap and extending through an opening in said web, and a stop shoulder on the lower end of said rod.

5. In a vehicle, the combination of a frame, a supporting bearing carried thereby, a dirigible wheel, a fork supporting said dirigible wheel and comprising a tubular plunger portion extending into said bearing, a web extending laterally across said tubular plunger, a spring in said plunger resting on said web, a cap secured to said supporting bearing, and means connected with said cap and operative to prevent longitudinal displacement of said tubular plunger from said supporting bearing.

6. In a vehicle, the combination with a frame, a supporting bearing carried thereby, a steering wheel, a fork supporting said steering wheel, and comprising a tubular plunger portion extending into said bearing, a removable bearing bushing carried by said supporting bearing, a removable bearing sleeve carried by said plunger portion, a web extending laterally across said tubular plunger, a spring extending into said plunger and resting on said web, a cap secured to said supporting bearing, and means connected with said cap and operative to prevent longitudinal displacement of said tubular plunger from said supporting bearing.

7. In a vehicle, the combination with a frame, a supporting bearing carried thereby, a steering wheel, a fork supporting said steering wheel and comprising a hollow plunger portion extending into said bearing, a web extending laterally across said tubular plunger, a spring extending into said plunger and resting on said web, a plurality of spaced longitudinally extending internal ribs in said hollow plunger adjacent the upper end thereof, a cap secured to said supporting bearing, and means connected with said cap and operative to prevent longitudinal withdrawal of said hollow plunger from said supporting bearing.

BERGER STOCKFLETH.
FREDERICK W. BURGER.